F. W. HILD.
TRACK RAIL CLEANER.
APPLICATION FILED JULY 28, 1909.

998,773.

Patented July 25, 1911.

2 SHEETS—SHEET 1.

Witnesses:
W. P. Burk
John A. Percival

Inventor:
Frederic Waldorf Hild
By
ATTY.

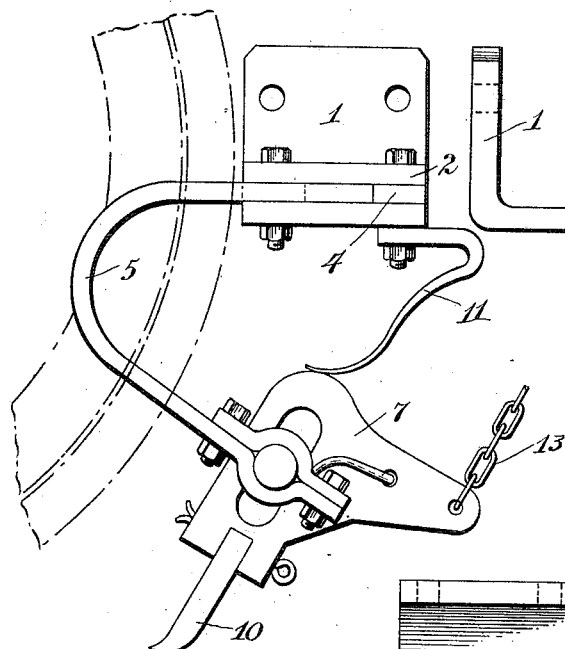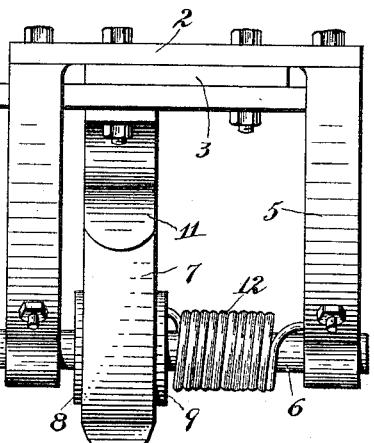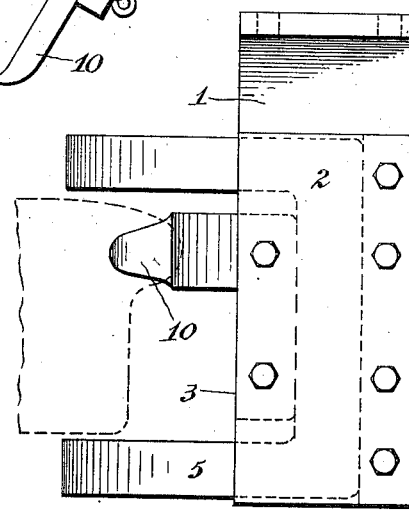

UNITED STATES PATENT OFFICE.

FREDERIC WALDORF HILD, OF HABANA, CUBA.

TRACK-RAIL CLEANER.

998,773. Specification of Letters Patent. Patented July 25, 1911.

Application filed July 28, 1909. Serial No. 510,109.

*To all whom it may concern:*

Be it known that I, FREDERIC WALDORF HILD, a citizen of the United States, residing at the city of Habana, Republic of Cuba, have invented new and useful Improvements in Track-Rail Cleaners, of which the following is a specification.

My invention consists of an apparatus for cleaning and removing from grooved and girder rails, such obstructions as dirt, sand, small stones, snow, etc., which interfere with the free passage of the flanges of car wheels along the grooves or channels of traction rails.

Figure 1:
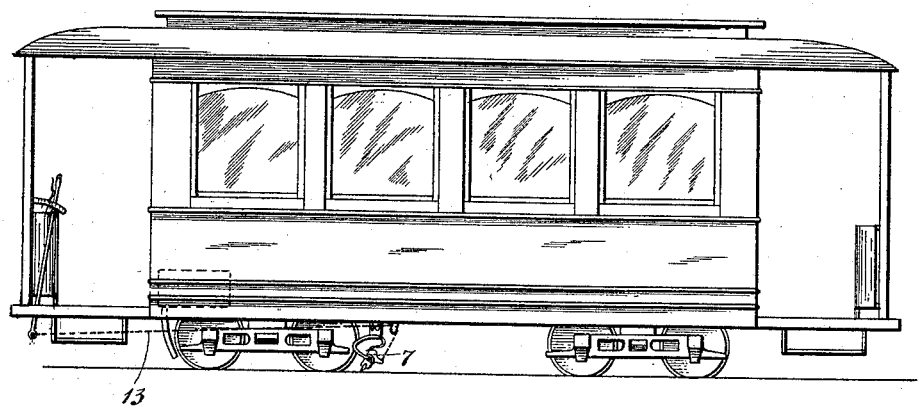

As shown on Sheet I, Figure 1, the device is mounted on the truck or body of the car close to and partially surrounding one of the forward wheels. A rope or chain passing over one or more pulleys suitably placed, and connecting with a lever or crank on the front platform or cab of the car, enables the driver of the latter by a single movement of the lever or crank to place the device into service or out of service at the will of the driver.

Figure 2:
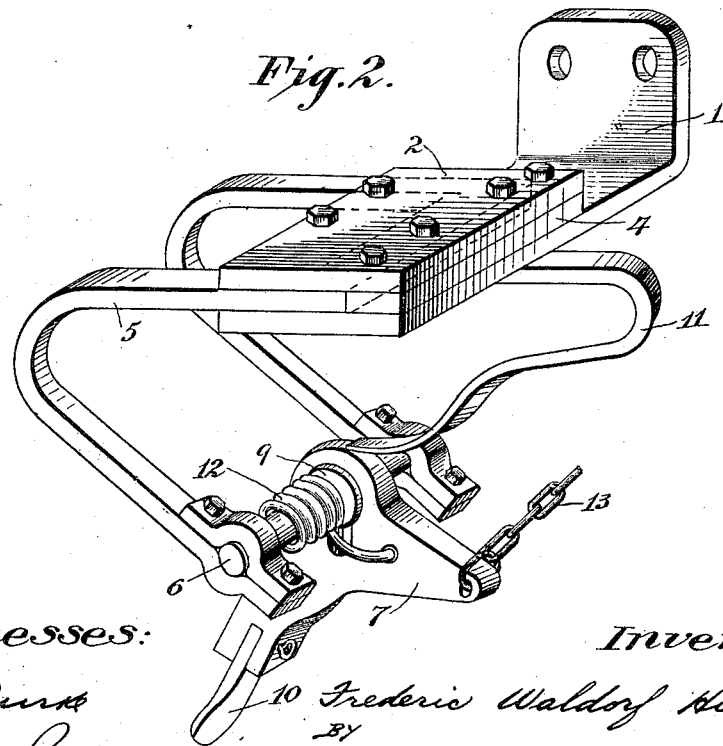

On Sheet I, Fig. 2, and on Sheet II Figs. 3, 4, and 5, it will be seen that (1) is a metallic bracket bolted to the truck or body of the car. (2) is a plate bolted to bracket (1) from which it is separated by space blocks (3) and (4). The blocks, (3) and (4), may be separate pieces or else be forged or cast integral with brackets (1). Between brackets (1) and plate (2) is the bent U shaped guide (5), the connection with the bracket being such that guide (5) may not move up or down with respect to bracket (1) but may be moved transversely with respect to the rails. Mounted on guide (5) by means of suitable bearings or trunnions is rock shaft (6), to which is loosely secured the bell crank (7); an elongated hole or slot in crank (7) through which shaft (6) passes, permits crank (7) to move bodily in the direction of the slot and also to rotate around shaft (6) as an axis. Two washers (8) and (9) rigidly fastened to shaft (6) prevent the movement of crank (7) in the axial direction of shaft (6). Thus crank (7) and the knife or scraper (10) which is tightly secured to crank (7) may move with respect to shaft (6) in a plane perpendicular to the axis of shaft (6). A bent or spiral spring (11) rigidly secured to bracket (1) tends to force crank (7) and therefore knife (10) in its lowermost position. A helical spring (12) surrounding the rock shaft (6) and rigidly secured at one end to guide (5) and at the other end to crank (7), tends to turn crank (7) around shaft (6) as an axis. Thus the helical spring (12) tends to force the knife (10) forward, *i. e.* toward the car wheel, so that normally the knife is held clear of rail and out of service. When, however, the driver of the car pulls on the rope or chain (13) which is secured to crank (7) and thus tends to force crank (7) and knife (10) in the opposite direction against spring (12), the knife (10) is brought into a vertical or nearly vertical position, and scrapes the grooves or channels of the rails as clearly shown in Fig. 4. The spring (11) while forcing crank (7) and knife (10) downward thus supplements spring (12) when the knife (10) is in the position for scraping the rail channel. Its function is to give additional resiliency to crank (7) and knife (10) on encountering an unusual obstruction in the rail channel.

The device is mounted close to the leading car wheel so that the knife (10) is directly in line with the wheel flange, and also so that the guide (5) straddles the car wheel as shown on Sheet II, Figs. 3 and 5. Any lateral movement of the car wheel will be communicated to the guide (5) which in turn will transmit such lateral movement to shaft (6), crank (7) and knife (10). Thus the knife (10) is constantly in line with the flange of the car wheel, and hence with the groove or channel of the track rail.

In practice, water is carried on the car and is led by means of suitable piping to the rail groove or channel, the outlet being placed just ahead of the car wheel which guides the track cleaning device; as shown in Fig. 1 the water lays the dust and converts into mud the dirt in the rail grooves.

With the device as described, the knife (10) will always enter and bear against the bottom and sides of the rail groove, no matter what the curvature or the special work in the tracks. The knife or scraper (10) is shaped to suit the rail which is to be cleaned and furthermore has a twist such that in the movement of the knife along the groove, the dirt and other obstructions are thrown toward the center of the track and away from the head of the rail. The device being carried on the car itself, the movement of the car supplies the force which draws the scraper (10) along the rail and therefore cleans it.

What I claim as my invention and wish to protect by Letters Patent, is as follows:—

1. In combination with a car, a bracket bolted to the truck of the car, a forked movable guide supported by the bracket and straddling one of the wheels of the car, so that the lateral movement of the car wheel imparts to the forked movable guide the only movement the said guide is capable of with respect to the supporting bracket.

2. In combination with a car, a guide movably supported thereon and embracing one of the wheels of the car and a track scraper flexibly supported by said guide.

3. In combination with a car, an apparatus having a movable guide straddling a car wheel, a flexibly supported scraper, and means for manipulating said scraper.

4. In combination with a car, an apparatus having a movable guide controlled in its lateral movement by the car wheel, a rock shaft carried by the guide, a bell crank carried by the rock shaft, a spring bearing on the bell crank, a flexible element attached to the bell crank and a lever on the car connected with said element.

5. In combination with a car, an apparatus having a movable guide straddling a car wheel and thus controlled in its lateral movement by said car wheel, a shaft carried by the guide, a bell crank carried by the shaft, a spring bearing on the bell crank, a scraper or knife attached to the bell crank, a flexible element attached to the bell crank and a lever on the car connected with said element.

In testimony whereof I have signed my name to this specification in the presence of two subscribing witnesses.

FREDERIC WALDORF HILD.

Witnesses:
VICTOR NORMAND,
A. ROGERS.

---

Copies of this patent may be obtained for five cents each, by addressing the "Commissioner of Patents, Washington, D. C."